United States Patent
Wong et al.

(10) Patent No.: US 6,970,339 B2
(45) Date of Patent: Nov. 29, 2005

(54) CURRENT LIMIT PROTECTION SCHEME FOR PWM BUCK CONVERTER WITH SYNCHRONOUS RECTIFIER

(75) Inventors: Kae Wong, Dallas, TX (US); Xiaoyu Xi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/833,683

(22) Filed: Apr. 27, 2004

(65) Prior Publication Data

US 2005/0237688 A1    Oct. 27, 2005

(51) Int. Cl.[7] .............................. H02H 3/08; H02H 9/02
(52) U.S. Cl. ..................................................... 361/93.1
(58) Field of Search ................................. 361/93.1, 18; 363/56.1

(56) References Cited

U.S. PATENT DOCUMENTS

| | | | | |
|---|---|---|---|---|
| 4,928,200 | A | | 5/1990 | Redl et al. ...................... 361/93 |
| 5,179,508 | A | | 1/1993 | Lange et al. ................... 363/16 |
| 5,285,145 | A | | 2/1994 | Minowa ...................... 318/808 |
| 5,285,366 | A | | 2/1994 | Zaretsky ....................... 363/56 |
| 5,828,558 | A | | 10/1998 | Korcharz et al. ............. 363/20 |
| 5,847,554 | A | * | 12/1998 | Wilcox et al. .............. 323/282 |
| 5,926,383 | A | | 7/1999 | Pilukaitis et al. ............. 363/50 |
| 6,081,435 | A | | 6/2000 | Mandelcorn et al. ......... 363/56 |
| 6,166,528 | A | * | 12/2000 | Rossetti et al. ............. 323/283 |
| 6,407,688 | B1 | | 6/2002 | Greig .......................... 341/136 |
| 6,504,351 | B2 | * | 1/2003 | Eagar et al. ................. 323/282 |
| 6,541,939 | B2 | | 4/2003 | Kishibe et al. ............. 318/799 |
| 6,545,882 | B2 | | 4/2003 | Yang ....................... 363/21.08 |
| 6,597,240 | B1 | | 7/2003 | Walburger et al. ............ 330/10 |

(Continued)

OTHER PUBLICATIONS

A 12-Bit Intrinsic Accuracy High-Speed CMOS DAC, Bastos et al, IEEE Journal of Solid-State Circuits, vol. 33, No. 12, Dec., 1998, pp 1959-1969.

(Continued)

*Primary Examiner*—Stephen W. Jackson
*Assistant Examiner*—Z Kitov
(74) *Attorney, Agent, or Firm*—J. Dennis Moore; W. James Brady, III; Frederick J. Telecky, Jr.

(57) ABSTRACT

A embedded overcurrent protection circuit within the PWM feedback controller (30) of a power converter (100) having an novel current limit detection function that minimizes the effects of the turn-on period of the power device (14) is disclosed herein. This power converter includes a current limit detection circuit (10–20) that is reset on the rising edge of the system clock in a first step. In a second step, the power device (14) that is turned on. In another step, a current detecting circuit (10–20) detects the drain-to-source voltage across the power device (14) and the output current generated thereby. A sense circuit (18) compares the output current detected with a first predetermined limit value in another step. When the output current is less than the first predetermined limit value, a step is conducted where the output current is regulated by modulating the pulse width of the signal sent by a driver (12) to the control node of the power device (14). In the alternative, when the output current exceeds the first predetermined limit value, the power device (14) is turned off and the synchronous rectifier (16) is turned on while its current is monitored at a second predetermined limit value in another step. This synchronous rectifier (16) monitoring step enables the current limit detection circuit (10–20) to minimize the effects of the turn-on period of the power device (14). Finally, the current limit detection circuit (10–20) is reset on the rising edge of the system clock and wherein this entire procedure is continuous.

3 Claims, 4 Drawing Sheets

U.S. PATENT DOCUMENTS

| | | | |
|---|---|---|---|
| 6,603,417 B2 | 8/2003 | Greig | 341/136 |
| 6,608,578 B2 | 8/2003 | Lee et al. | 341/144 |
| 6,661,679 B1 | 12/2003 | Yang et al. | 363/41 |
| 2004/0196055 A1* | 10/2004 | Pearce et al. | 324/713 |

OTHER PUBLICATIONS

A 10-Bit 1-GSample/s Nyquist Current-Steering CMOS D/A Converter, Bosch et al. IEEE Journal of Solid-State Circuits, vol. 36, No. 3, Mar., 2001.

A 350-MS/s 3.3-V 8-bit CMOS D/A Converter Using a Delayed Driving Scheme, Kohno et al., IEEE 1995 Custom Integrated Circuits Conference, pp 211-214.

Torque Maximizing Control of Permanent Magnet Synchronous Motor under Voltage amd Current Limitations of PWM Inverter, Song et al., Jul., 1996 IEEE, pp758-763.

Modeling the Switch of PWM Converters, Sam Ben-Yaakov, IEEE Transactions on Aerospace and Electronic Systems, vol. 28, o. 3, Jul. 1992, pp 921-925.

* cited by examiner

CURRENT LIMIT PROTECTION SCHEME FOR PWM BUCK CONVERTER WITH SYNCHRONOUS RECTIFIER

FIELD OF THE INVENTION

The present invention relates to a pulse width modulated (PWM) buck power converter, and, more particularly, to a PWM buck converter having a synchronous rectifier with an improved current limit protection scheme.

BACKGROUND OF THE INVENTION

Embedded overcurrent protection circuits within power converters completely shut-off the respective power converter which remains off until the overcurrent condition is removed and the input power has recycled. This function is desirable to protect the power converter from internal or external component failure and to prevent excessive heating in those failed components. These circuits have been used in power supplies for more than a decade. Advantages of these circuits include increased functionality and efficiency in cost using a minimum number of components. More specifically, overcurrent protection circuits are very simple.

A conventional buck power converter 100 includes a PWM controller 30 that couples to a driver which couples directly to the control node a power switch as is shown in FIG. 1. Depending upon the applications, the power switch may be a PMOS or a NMOS device. In particular in FIG. 1, the power switch is the PMOS transistor 14. Current limit sense circuits, 18 and 20, connect to sense the drain-to-source voltages $V_{sd}$ of the PMOS transistor 14. To further improve the power conversion efficiency, it is a common practice to add a synchronous rectifier, such as the NMOS transistor 16, connected in parallel with a Schottky diode 32. As a means of preventing the inductor 34 connected to the drain nodes of each switch from being saturated, it is necessary to monitor and limit the inductor current within the PWM Buck converter 100.

As shown, in integrated circuits where the power switches, 14 and 16, are built-in on the chip, this monitoring is usually done by sensing the voltage drop across the power switch 14 when the switch is turned on. As described, the current limit sense circuits, 18 and 20, connect across each transistor, 14 and 16, to sense the drain-to-source voltage of each transistor, 14 and 16. The output voltage across the capacitor 36 connected to the inductor 34 is feedback through a filter 24 to a main error comparator 22. The main error comparator 22 compares the filtered output voltage with a reference voltage signal, typically a sawtooth wave as shown. The main error comparator 22 provides the result to the PWM controller 10. Effectively, the monitoring circuit including the feedback scale 24 and the main error comparator 22 compares this voltage drop with the preset reference voltage to determine whether the inductor current exceeds the current limit and initiate actions to protect the inductor 34.

With the described current limit scheme, whenever the comparator 22 detects the sensed voltage drop exceeds the reference, i.e. the inductor current is over the preset limit, it triggers the protection circuit to turn off the PMOS power switch 14 for the rest of the clock period. A simplified current limit state diagram 200 for the known buck power converter of FIG. 1 is shown in FIG. 2. Initially, the current limit detection circuit is reset in step 202. The power switch 14 is turned on in step 204. After a determination of whether the PMOS current is over the limit, if the PMOS current is not over the limit, the PWM feedback loop decision is made in step 206. On the rising edge of the system clock, the current limit detection circuit is reset in step 202. If, in the alternative, the PMOS current is over the limit, step 208 dictates that the PMOS power switch 14 is shut off. Afterwards on the rising edge of the system clock, the current limit detection circuit is reset in step 202. Using this scheme in step 202, the current limit detection circuit must be reset at the beginning of every clock cycle. In other words, the PMOS power switch 14 has to be turned on every clock period to sample the current in the form of a voltage drop across the switch before the detection circuit, including elements 18, 20, 22 and 24, can determine whether the output current exceeds its limit. Since the detection circuit has no information about the inductor current level when the switch is open, the current limit detection has to be reset on every clock cycle.

Since current limit detection is reset every clock cycle, however, the PMOS power switch 14 turns on for a short period of time in every clock cycle. The length of time the switch 14 is turned on is determined by how fast the comparator 22 can react to the over current and the feedback loop delay. Although the length of time for the turn-on period is short, the inductor current builds up during this turn-on period until the power switch 14 is turned off. The inductor current begins to decrease once the power switch 14 is turned off, where the slope of the inductor current depends on the output voltage.

Even this short turn-on period of the power switch 14 in every clock cycle presents a substantial problem given certain input and output conditions. For example, when the output of the buck power converter 100 is accidentally shorted to ground and the input voltage is relatively high, the current limit circuit 18 may not be able to limit the inductor current at all. In addition, when the power switch 14 is on, the output current could ramp up swiftly due to the large voltage across the inductor 34. Moreover, when the power switch 14 is off as shown in step 208, the current decreases extremely slow since the reverse voltage across the inductor 34 is relatively small and the addition of the synchronous rectifier, NMOS transistor 16, makes the current decrease further. If the delay arising from resetting the current limit during turn-on time of the power switch 14 which includes time to detect the current limit and to turn off power switch is too long, the output current could build up too quickly. As a result, the current limit system is not able to keep the current within the preset limit. To avoid this problem, the comparator 22 and the steps (202, 204, and 206) required to detect the current limit have to be fast enough to minimize the turn-on period of the PMOS power switch 14. A fast comparator 22, however, is usually undesirable for a low power system since it will require a larger amount of current consumption.

The present invention is directed to overcoming, or at least reducing the effects of one or more of the problems set forth above.

SUMMARY OF THE INVENTION

To address the above-discussed deficiencies of power converters, the present invention teaches a novel method of limiting the current using an embedded overcurrent protection circuit within a power converter. The power converter includes a power device that is turned on in a first step. In another step, a current detecting circuit detects the drain-to-source voltage across the power device and the output current generated thereby. A comparator compares the output current detected with a first predetermined limit value in another step. When the output current is less than the first predetermined limit value, a step is conducted where the output current is regulated by modulating the pulse width of the signal sent by a driver to the control node of the power device. In the alternative, when the output current exceeds the first predetermined limit value, the power device is turned off and the synchronous rectifier is monitored at a second predetermined limit value in another step. Finally, the current limit detection circuit is reset on the rising edge of the system clock and wherein this entire procedure is continuous.

The synchronous rectifier monitoring step includes turning on the synchronous rectifier and monitoring the current in the synchronous rectifier. In another step, the current in the synchronous rectifier is compared with the second predetermined limit value. This step is repeated when the current in the synchronous rectifier is equal and greater than the second predetermined limit value. In the alternative, when the current in the synchronous rectifier is less than the second predetermined limit value, the synchronous rectifier is turned off.

Advantages of this current limit scheme include but are not limited to having an inductor current that is always ramping down during the current limit condition. In addition, the current limit comparator speed becomes less critical for designs that include a fast switching PWM Buck converter.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art.

The present invention is best understood by comparison with the prior art. Hence, this detailed description begins with a discussion of known buck converter apparatus shown in FIG. 1. A regulation circuit 30, such as a pulse-width-modulation (PWM) controller, senses the output voltage $V_{out}$ across capacitor 36 and controls the switching of the first and second controllable switches 14 and 16 using a gate driver 12. The construction and operation of regulation circuits and gate drivers are well known in the art and will hereinafter not be described in detail.

Figure 1:
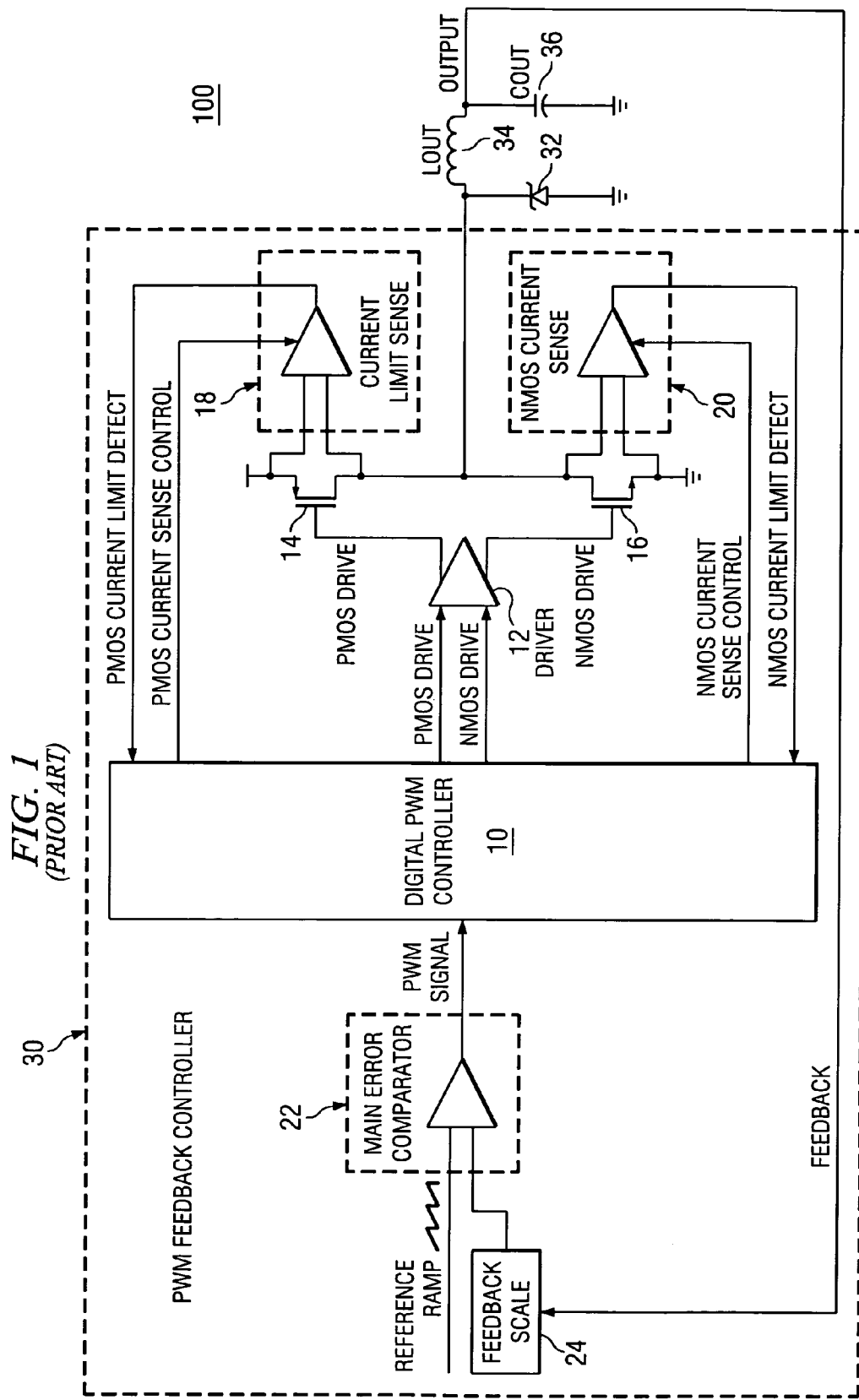
FIG. 1 illustrates a known PWM Buck converter.
Figure 2:
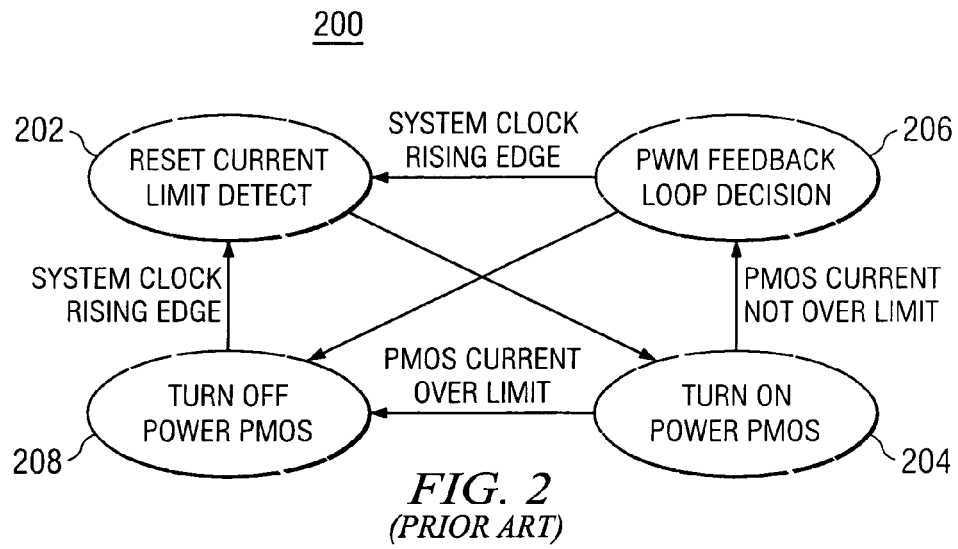
FIG. 2 displays the state diagram of a known method of current limit detection for the buck converter of FIG. 1.

FIG. 2 represents the state diagram of the process for the known PWM controller of FIG. 1. As described previously, the current limit detection circuit is reset initially in step 202. The power switch 14 is turned on in step 204. After a determination of whether the PMOS current is over the limit, if the PMOS current is not over the limit, the PWM feedback loop decision is made in step 206. On the rising edge of the system clock, the current limit detection circuit is reset in step 202. If, in the alternative, the PMOS current is over the limit, step 208 dictates that the PMOS power switch 14 is shut off. Afterwards on the rising edge of the system clock, the current limit detection circuit is reset in step 202.

As described previously, a shown in step 202, the current limit detection circuit must be reset at the beginning of every clock cycle. Thereby, the PMOS power switch 14 has to be turned on every clock period to sample the current in the form of a voltage drop across the switch before the detection circuit, including elements 18, 20, 22 and 24, can determine whether the output current exceeds its limit. Although the length of time for the turn-on period is short, the inductor current builds up during this turn-on period until the power switch 14 is turned off. Even this short turn-on period of the power switch 14 in every clock cycle presents a substantial problem given certain input and output conditions.

The power converter in accordance with the present invention takes into account the fact that the synchronous rectifier is readily available in most buck converters. An approach to solve the foregoing problem is to keep the power switch off once inductor current has reached its limit and only turn the power switch back on when the inductor current ramps down below the current limit. During the period when the power switch is off, the synchronous rectifier can be used to continue sensing the inductor current wherein the comparator is used to control the synchronous rectifier during normal operation using a different reference or predetermined current limit value to detect if the inductor current has dropped below the limit. Once inductor current falls back within limit, the PWM controller can then clear the current limit state and allow the power switch to be turned back on again.

Figure 3:
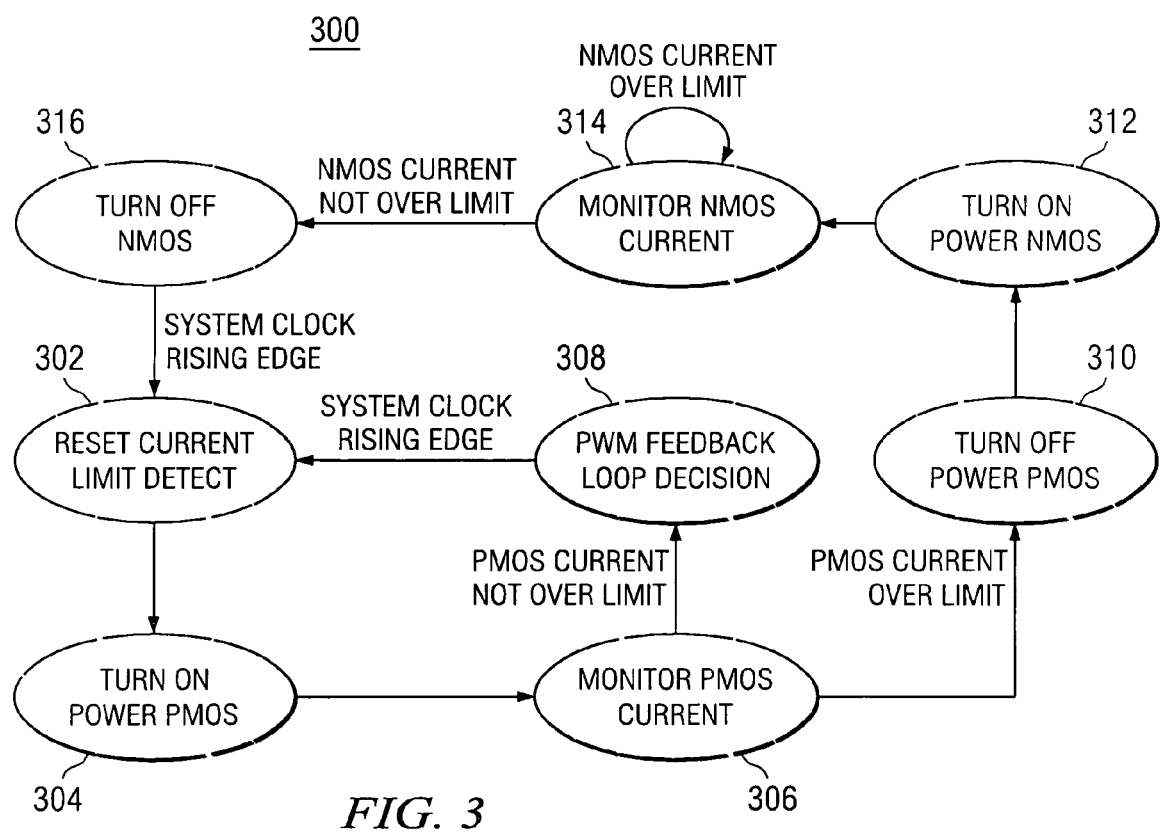
FIG. 3 shows the state diagram for a method of current limit detection in accordance with the present invention.

FIG. 3 illustrates this novel method of limiting the current using an embedded overcurrent protection circuit within a power converter having a power device. Initially in step 302, the current limit detection circuit is reset on the rising edge of the system clock. The PMOS power device is turned on in a step 304. In the another step 306, a the PMOS current is monitored using a current detecting circuit to detect the drain-to-source voltage across the power device and the output current generated thereby. A comparator compares the output current detected with a first predetermined limit value in the same step. When the output current is less than the first predetermined limit value, step 308 conducts a PWM feedback loop decision determination. As is known to those skilled in the art, PWM Buck converter 100 is a voltage regulator that regulates an output voltage using a Pulse Width Modulation (PWM) method. The converter feedback loop 308 regulates the output level by modulating the pulse width of the PMOS gate drive. As a result, the converter 100 is able to achieve output voltage regulation by controlling the current that flows through inductor 34 which charges output capacitor 36. At each clock cycle, the feedback loop decides the pulse width necessary to achieve voltage regulation. This process is how the PWM feedback loop decision determination is conducted in step 308.

In the alternative, when the output current exceeds the first predetermined limit value, the power device is turned off in step 310 and the synchronous rectifier is turned on in step 312. In step 314, the current from the synchronous rectifier is monitored until the current is less than a second predetermined limit value. When the current is less than the second predetermined limit value, the synchronous rectifier is turned off in step 316. Finally in step 302, the current limit detection circuit is reset on the rising edge of the system clock and entire procedure is repeated.

The synchronous rectifier monitoring step includes turning on the synchronous rectifier in step 312 and monitoring the current in the synchronous rectifier in step 314. Further, in step 314, the current in the synchronous rectifier is compared with the second predetermined limit value. This step is repeated when the current in the synchronous rectifier is equal to or greater than the second predetermined limit value. In the alternative, when the current in the synchronous rectifier is less than the second predetermined limit value, the synchronous rectifier is turned off in step 316. Finally in step 302, the current limit detection circuit is reset on the rising edge of the system clock and entire procedure is repeated.

To summarize the proposed control scheme, the PWM controller 30 locks in a current limit state and turn off the power switch 14 immediately once the voltage $V_{ds}$ across the power switch 14 exceeds the first predetermined limit value. PWM controller 30 keeps the power switch 14 off while it continues to monitor the inductor current using the synchronous rectifier, NMOS transistor 16. PWM controller 30 stays in current limit stage until comparator detects the inductor current by utilizing the synchronous rectifier 16 has dropped within the second predetermined limit value. The PWM controller 30 then clears the current limit state and return to normal operation.

Advantages of this current limit scheme include but are not limited to having an inductor current that is always ramping down during the current limit condition. In addition, the current limit comparator speed becomes less critical for designs that include a fast switching PWM Buck converter.

Figure 4:
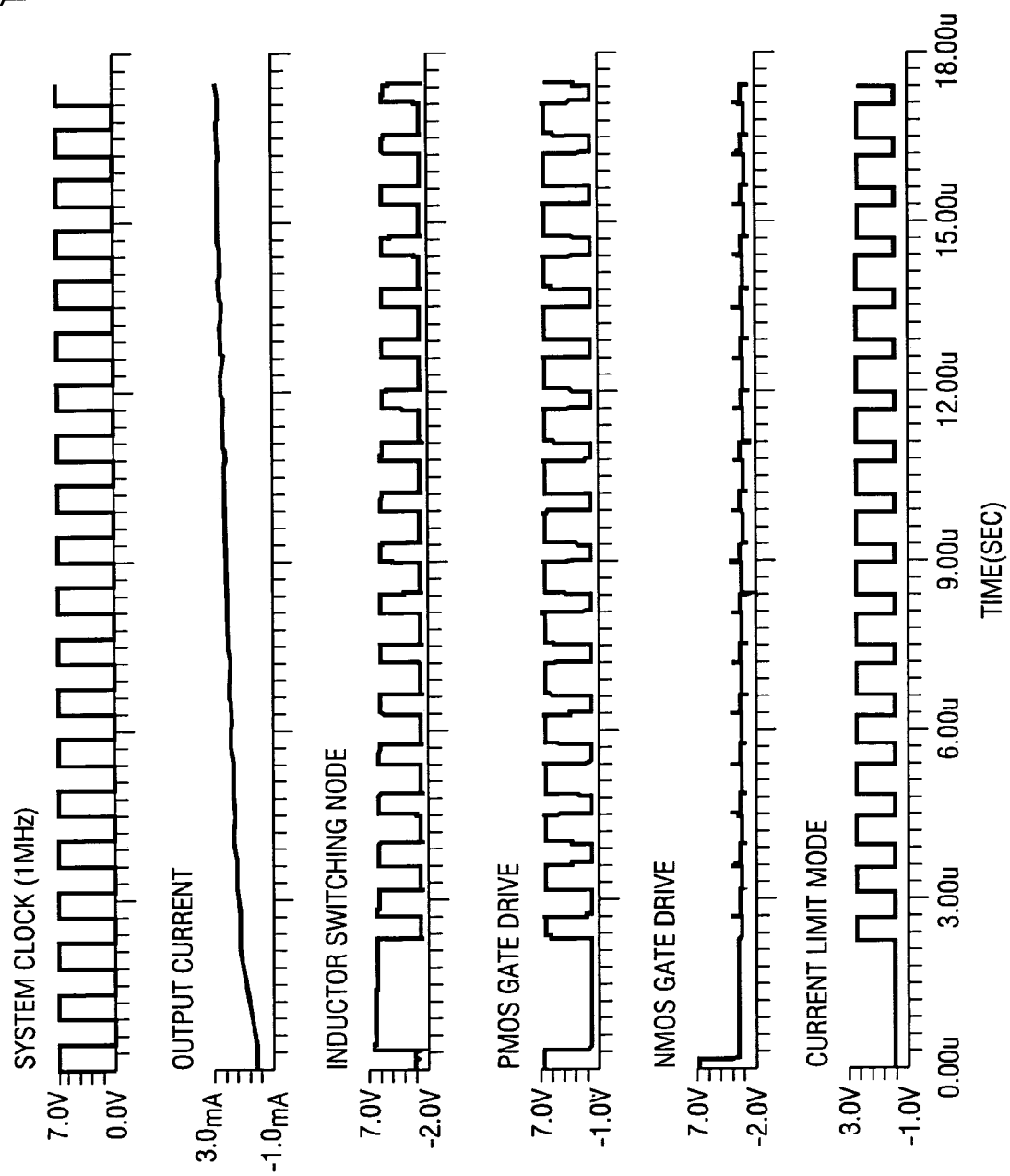
FIG. 4 displays the graph of the system clock, the output current, the inductor switching node, the PMOS gate drive, the NMOS gate drive, and the current limit node signals of the buck converter of FIG. 1 using the known method disclosed in FIG. 2.
Figure 5:
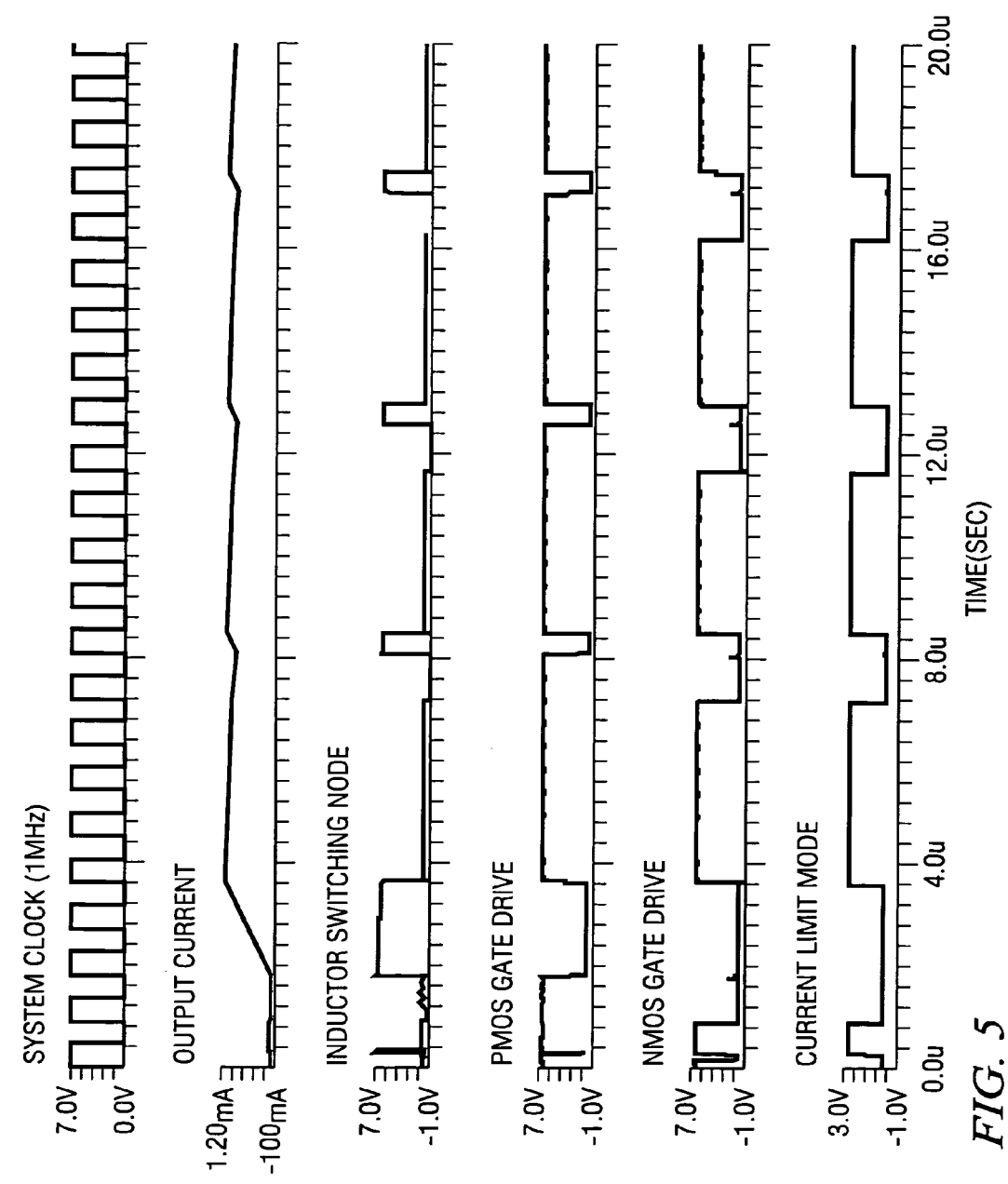
FIG. 5 illustrates the graph of the system clock, the output current, the inductor switching node, the PMOS gate drive, the NMOS gate drive, and the current limit node signals of the buck converter of FIG. 1 using the method disclosed in FIG. 3 in accordance with the present invention.

The simulation results shown below FIGS. 4 and 5 illustrated the current limit/short circuit performance of two PWM Buck converters, with architecture shown in FIG. 1. The only difference between these two converters is the current limit scheme. The current limit threshold for both converts is et at about 1A (DC). The both outputs are shorted to ground, the switching frequency for these systems is 1 MHz, and the input voltage is 6.5V.

FIG. 4 displays the graph of the system clock, the output current, the inductor switching node, the PMOS gate drive, the NMOS gate drive, and the current limit node signals of the buck converter of FIG. 1 using the known method disclosed in FIG. 2. The signal "Current Limit Mode" is reset every clock cycle. Even though the output current is already over the 1A limit, it takes certain amount of delay for the "Current Limit Mode" to be set by the current limit comparator in an effort to turn off the power PMOS as shown referring to signals "PMOS Gate Drive" and "Current Limit Mode". As indicated, the output current keeps building up during this delay period where the PMOS is momentarily on.

FIG. 5 illustrates the graph of the system clock, the output current, the inductor switching node, the PMOS gate drive, the NMOS gate drive, and the current limit node signals of the buck converter of FIG. 1 using the known method disclosed in FIG. 3 in accordance with the present invention. As indicated by signal "PMOS Gate Drive", the power PMOS is turned off for multiple clock cycles to let the output current decrease. The NMOS synchronous rectifier is turned on immediately when the PMOS is off as indicated with signal "NMOS Gate Drive". The synchronous rectifier comparator then continues monitor the inductor current. The PMOS is kept off until the inductor current is detected to be lower than the second predetermined current limit by the synchronous rectifier comparator.

Those of skill in the art will recognize that the physical location of the elements illustrated in FIG. 1 can be moved or relocated while retaining the function described above.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A method of limiting the current using an embedded overcurrent protection circuit within a power converter having a power device, comprising the steps of:

a. resetting a current limit detection circuit within the power converter on the rising edge of the system clock;

b. turning on the power device, having a control node;

c. detecting the drain-to-source voltage across the power device and the output current generated thereby by a current detecting circuit;

d. comparing the output current detected by a comparator with a first predetermined limit value;

e. regulating the output current by modulating the pulse width of the signal sent to the control node of the power device, when the output current is less than the first predetermined limit value;

f. turning the power device off when the output current exceeds the first predetermined limit value and monitoring a synchronous rectifier for a second predetermined limit value, wherein the synchronous rectifier monitoring step includes:

i. turning on a synchronous rectifier;

ii. monitoring the current in the synchronous rectifier;

iii. comparing the current in the synchronous rectifier with the second predetermined limit value;

iv. repeating step iii, when the current in the synchronous rectifier is equal to or greater than the second predetermined limit value; and v. turning off the synchronous rectifier, when the current in the synchronous rectifier is less than the second predetermined limit value; and g. repeating steps a through f.

2. The method of limiting the current using an embedded overcurrent protection circuit within a power converter having a power device as recited in claim 1, wherein the power device is a PMOS transistor.

3. The method of limiting the current using an embedded overcurrent protection circuit within a power converter having a power device as recited in claim 1, wherein the synchronous rectifier is a NMOS transistor.

* * * * *